(12) United States Patent
Sathyanarayana et al.

(10) Patent No.: US 7,822,577 B2
(45) Date of Patent: Oct. 26, 2010

(54) METHODS AND SYSTEMS TO DEVELOP AN EXPERIENCE-BASED PROBABILISTIC LIFING PROCESS

(75) Inventors: Dileep Sathyanarayana, Schenectady, NY (US); Peter J. Eisenzopf, Altamont, NY (US)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 11/839,333

(22) Filed: Aug. 15, 2007

(65) Prior Publication Data

US 2009/0048787 A1 Feb. 19, 2009

(51) Int. Cl.
*G06F 11/30* (2006.01)
(52) U.S. Cl. ..................................................... 702/182
(58) Field of Classification Search .................. 702/182, 702/184, 34; 701/29
See application file for complete search history.

(56) References Cited

U.S. PATENT DOCUMENTS

| | | | |
|---|---|---|---|
| 6,226,597 B1 | 5/2001 | Eastman et al. | |
| 6,411,908 B1 * | 6/2002 | Talbott | ......................... 702/34 |
| 7,698,030 B2 * | 4/2010 | Martin | ......................... 701/29 |
| 2003/0101019 A1 * | 5/2003 | Klausner et al. | ............ 702/182 |
| 2006/0235707 A1 | 10/2006 | Goldstein et al. | |
| 2009/0132202 A1 * | 5/2009 | Walker et al. | ................ 702/184 |

* cited by examiner

*Primary Examiner*—Tung S Lau
*Assistant Examiner*—Xiuquin Sun
(74) *Attorney, Agent, or Firm*—Armstrong Teasdale LLP

(57) ABSTRACT

A method of facilitating a probabilistic lifting process is provided. The method includes obtaining operational data for at least one turbine engine, defining a plurality of cool-down curves for the at least one turbine engine, identifying a plurality of different start types of the at least one turbine engine, and developing a formula for the at least one turbine engine. The method also includes determining an operating strategy and establishing a design useful life for the at least one turbine engine, developing at least one histogram and a probabilistic model using the operational data, and determining a mission mix for the operating strategy by performing a simulation of the probabilistic model combined with cyclic life expenditure data of the at least one turbine engine.

12 Claims, 7 Drawing Sheets

TStart

% Life Expended in Life Design Years

Strategy # 2

Strategy # 3

METHODS AND SYSTEMS TO DEVELOP AN EXPERIENCE-BASED PROBABILISTIC LIFING PROCESS

BACKGROUND OF THE INVENTION

This invention relates generally to lifting processes, and more particularly, to methods and systems to develop a probabilistic lifting process based on operational strategies of rotating equipment.

Generally, component lifting is a process of estimating operational lifetimes of components. Often component lifting estimates are based on manufacturer's recommendations and product specifications. However, known empirical operational strategy definitions, also referred to as "mission mixes," for turbine engines, specified in product specifications, may result in turbine engine component design criteria based on unproven information. For example, using known empirical mission mixes may result in turbine engine annual operating hours estimated being greater than the total number of hours in a year, which is impossible. As a result, using known turbine engine empirical mission mixes may result in "over-designing" a product or component in order to meet over-inflated product design life criteria. Such design life criteria may lead to increased design and manufacturing costs.

BRIEF DESCRIPTION OF THE INVENTION

In one embodiment, a method of facilitating a probabilistic lifting process is provided. The method includes obtaining operational data for at least one turbine engine, defining a plurality of cool-down curves for the at least one turbine engine, identifying a plurality of different start types of the at least one turbine engine, and developing a formula for the at least one turbine engine. The method also includes determining an operating strategy and establishing a design useful life for the at least one turbine engine, developing at least one histogram and a probabilistic model using the operational data, and determining a mission mix for the operating strategy by performing a simulation of the probabilistic model combined with cyclic life expenditure data of the at least one turbine engine.

In another exemplary embodiment, a system for facilitating a probabilistic mission mix-based lifting process for turbine engine systems and sub-systems is provided. The system includes at least one computer configured as a server, the server contains a database and is configured to store within the database operational data for at least one turbine engine, a plurality of cool-down curves for the at least one turbine engine, a plurality of different start types for the at least one turbine engine, at least one operating strategy and a design useful life of the at least one turbine engine. The server is also configured to analyze the operational data stored within the database, develop at least one histogram and at least one probabilistic model using the operational data and store the at least one histogram and the at least one probabilistic model within the database, determine a mission mix for the at least one operating strategy, perform a simulation of the at least one probabilistic model combined with turbine engine cyclic life expenditure data of the at least one turbine engine, and obtain a probability distribution of a total cyclic life expenditure by extending a life expended over the design useful life of the at least one turbine engine.

In yet another exemplary embodiment, an apparatus for facilitating a probabilistic mission mix-based turbine engine lifting process is provided. The apparatus includes means for storing operational data for at least one turbine engine, a plurality of cool-down curves for the at least one turbine engine, a plurality of different start types for the at least one turbine engine, at least one operating strategy and a design useful life of the at least one turbine engine. The apparatus also includes means for analyzing the operational data stored within the database, means for developing at least one histogram and at least one probabilistic model using the operational data and means for storing the at least one histogram and the at least one probabilistic model, means for determining a mission mix for the at least one operating strategy, means for performing a simulation of the at least one probabilistic model combined with cyclic life expenditure data, and means for calculating a life expended during the simulation using the cyclic life expenditure data.

DETAILED DESCRIPTION OF THE INVENTION

Figure 1:
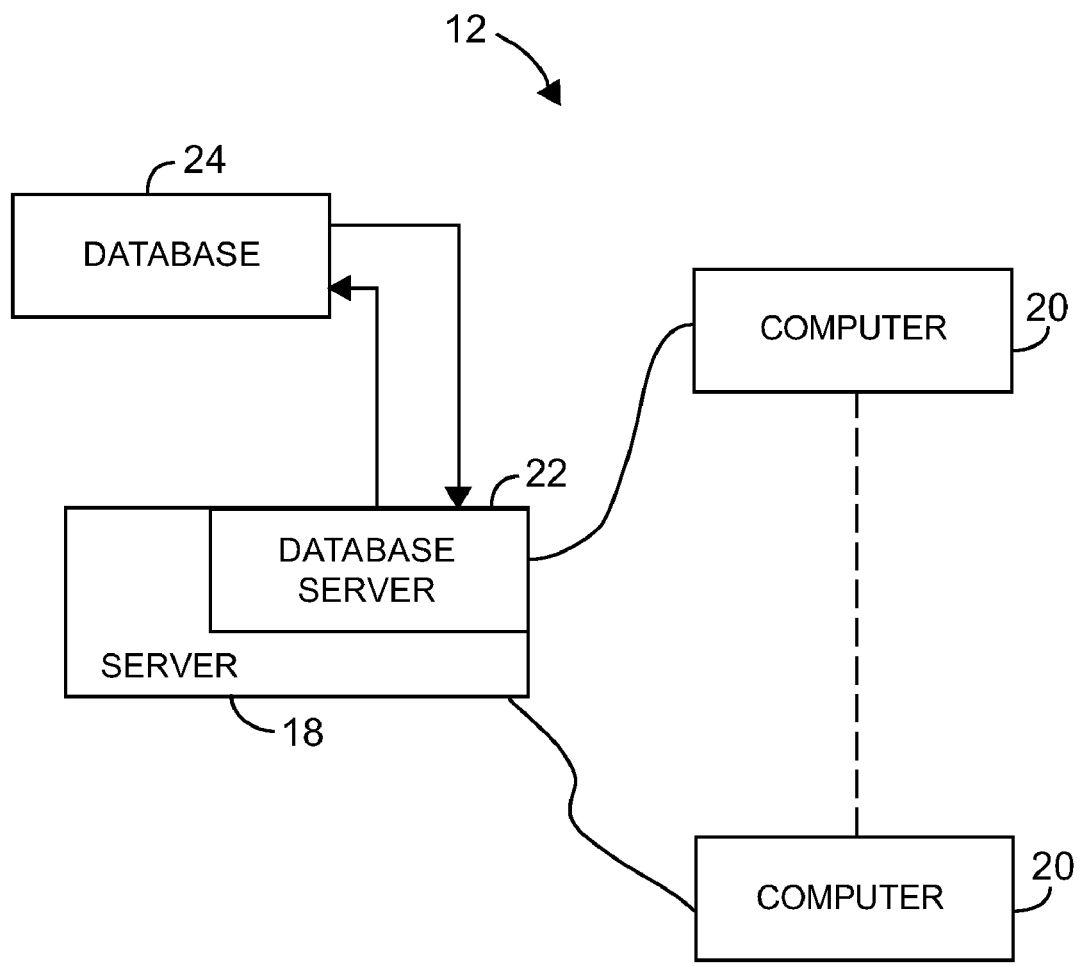
FIG. 1 is a simplified block diagram of an exemplary server architecture of a Component Lifting Process User Interface (CLPUI)

The methods and systems described herein facilitate a probabilistic mission mix-based turbine engine lifting process. As used herein, "mission mix" refers to an operational strategy for a machine that defines parameters of use of the machine over its life. Mission mix may also refer to the parameters the machine has experienced during past operational conditions. For example, a turbine engine may be used for baseload operations, where the unit experiences relatively few cooldown/restart cycles over its life. A turbine engine may also be used for peaking load applications, where the unit is subject to at least partial cooldown and restart cycles on a daily basis. A turbine engine may also experience a combination of these operational strategies depending on system loading and seasonal requirements. The methods and systems described herein are believed to be applicable to many different turbine engines and to many different types of components included in turbine engines. The exemplary embodiment described herein relates to the power generation business, however, the invention is in no way limited to use with only the power generation business. For example, the invention may also be used to facilitate a probabilistic mission mix-based lifting process for any utility, industrial or mechanical drive turbine engine.

Exemplary embodiments of systems that facilitate a probabilistic mission mix-based turbine engine lifting process are described below in detail. The systems facilitate, for example, using an analysis of field data to enhance turbine engine design useful life. One technical effect of the systems described herein includes calculating the expected total life expended over the total operational duration of a turbine engine. More specifically, in the exemplary embodiment, turbine engine and turbine engine component fabricating businesses or other entities engaged in the business of providing turbine engine components, may utilize the methods and systems of the exemplary embodiment to calculate an expected total life of the turbine engine, or a component within the turbine engine, over the operational duration of a turbine engine. In the exemplary embodiment, users of a Component Lifting Process User Interface (CLPUI) system are able to perform many tasks, such as, but not limited to, calculating the expected total life of a turbine engine expended over the operational duration of a turbine engine.

In the exemplary embodiment, field operational data is analyzed to identify trends or patterns that can provide insight into actual operational strategies of different turbine engines. More specifically, mission mixes are obtained using an analysis of field data and operational data from a representative sample of turbine engines. Operational strategies for different subsets, corresponding with different strategies are identified, and statistical models of the different operational strategies are developed, thus capturing expected variations present in the real world. Because the models are developed using real data, the total operational time is less than or equal to the number of hours in a year. Moreover, cool-down curves obtained from in-field operational turbine engines are incorporated into the evaluation of component life expenditure, thus leveraging field data during the design process.

In one embodiment, a computer program is embodied on a computer readable medium and utilizes a Structured Query Language (SQL) with a user interface for administration and an interface for standard input and generating reports. In another exemplary embodiment, a computer program may be provided using Microsoft's Excel spreadsheet programming tool to perform computations and generate reports. In an exemplary embodiment, the system is run on a business-entity intranet. In a further exemplary embodiment, the system is run in a Windows® NT environment (Windows is a registered trademark of Microsoft Corporation, Redmond, Wash.). The application is flexible and is designed for execution in various different environments without compromising any functionality.

The systems and processes are not limited to the specific embodiments described herein. In addition, components of each system and each process can be practiced independently and separately from other components and processes described herein. Each component and process also can be used in combination with other assembly packages and processes.

FIG. 1 is a simplified block diagram of a Component Lifting Process User Interface (CLPUI) system 12 including a server system 18, and a plurality of client sub-systems, also referred to as client systems 20, connected to server system 18. Computerized modeling and grouping tools, as described below in more detail, are stored in server 18 and can be accessed by a requester at any one of computers 20. A database server 22 is connected to a database 24 containing information on a variety of matters, as described below in greater detail. In one embodiment, centralized database 24 is stored on server system 18 and can be accessed by potential users at one of client systems 20 by logging onto server system 18 through one of client systems 20. In an alternative embodiment, database 24 is stored remotely from server system 18 and may be non-centralized.

Figure 2:
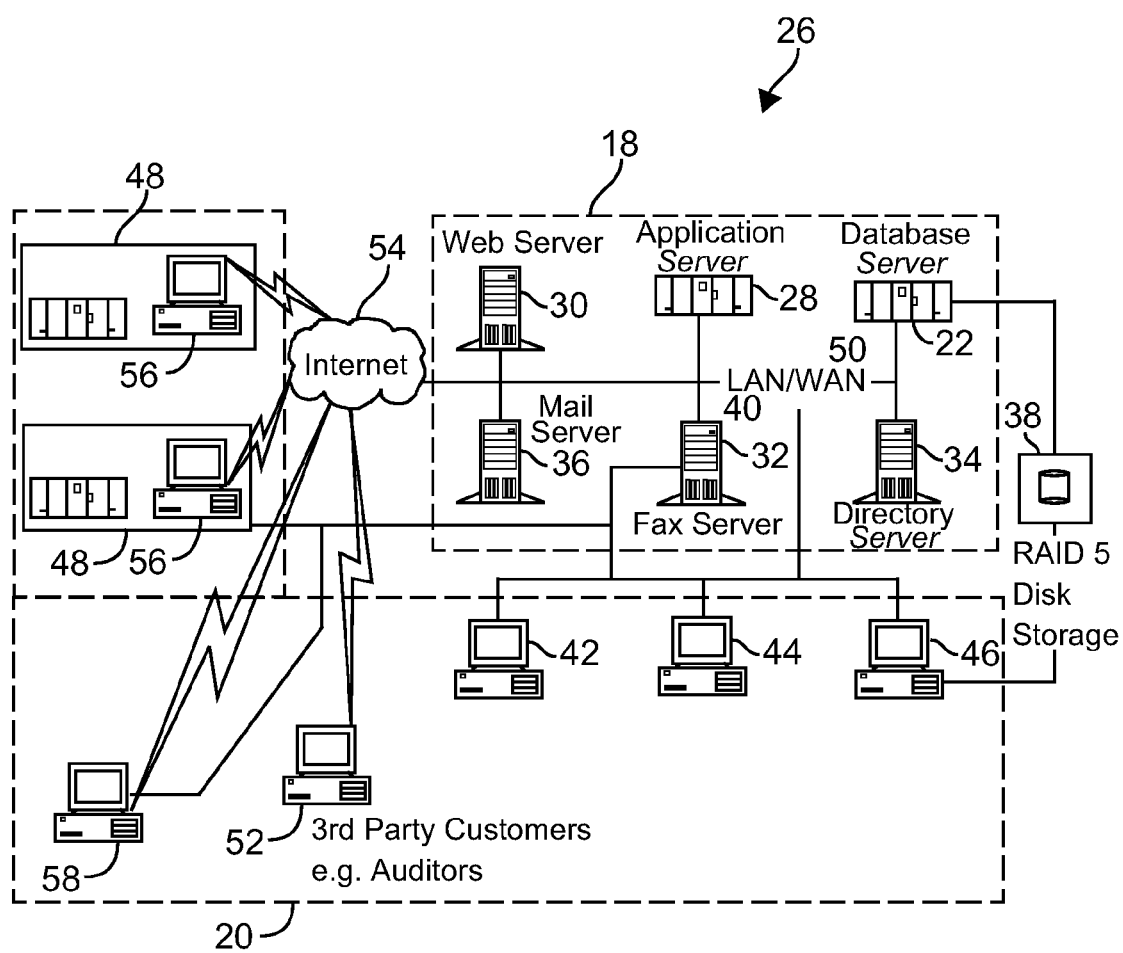
FIG. 2 is an expanded version block diagram of an exemplary server architecture that may be used to implement a CLPUI system.

FIG. 2 is an expanded block diagram of an exemplary embodiment of a server architecture of a Component Lifting Process User Interface system (CLPUI) 26. Components in CLPUI system 26, identical to components of system 12 (shown in FIG. 1), are identified in FIG. 2 using the same reference numerals as used in FIG. 1. CLPUI system 26 includes server system 18 and client systems 20. Server system 18 further includes database server 22, an application server 28, a web server 30, a fax server 32, a directory server 34, and a mail server 36. Disk storage unit 38 is coupled to database server 22 and directory server 34. Servers 22, 28, 30, 32, 34, and 36 are coupled in a local area network (LAN) 40. In addition, a system administrator's workstation 42, a user workstation 44, and a supervisor's workstation 46 are coupled to LAN 40. Alternatively, workstations 42, 44, and 46 are coupled to LAN 40 using an Internet link or are connected through an Intranet.

Each workstation, 42, 44, and 46 is a personal computer having a web browser. Although the functions performed at the workstations typically are illustrated as being performed at respective workstations 42, 44, and 46, such functions can be performed at one of many personal computers coupled to LAN 40. Workstations 42, 44, and 46 are illustrated as being associated with separate functions only to facilitate an understanding of the different types of functions that can be performed by individuals having access to LAN 40.

Server system 18 is configured to be communicatively coupled to various individuals, including employees 48 and to third parties, e.g., clients/customers 52, using an ISP Internet connection 54. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 40 could be used in place of WAN 50.

In the exemplary embodiment, any authorized individual having a workstation 56 can access CLPUI system 26. At least one of the client systems includes a manager workstation 58. Workstations 56 and 58 are personal computers configured to communicate with server system 18. Furthermore, fax server 32 communicates with client systems, including a client system 58 using a telephone link. Fax server 32 is configured to communicate with other client systems 42, 44, and 46 as well.

Workstations 42, 44, 46, 56 and 58 include computers that may include a device, such as, but not limited to, a floppy disk drive or CD-ROM drive, for reading data including the methods for quickly and accurately accessing baggage information from a computer-readable medium, such as a floppy disk, a compact disc-read only memory (CD-ROM), a magneto-optical disk (MOD), or a digital versatile disc (DVD). Moreover, workstations 42, 44, 46, 56 and 58 include display devices, such as, but not limited to, liquid crystal displays (LCD), cathode ray tubes (CRT) and color monitors. Furthermore, workstations 42, 44, 46, 56 and 58 include input devices such as, but not limited to, a mouse (not shown), a keyboard (not shown) and a graphical user interface (not shown).

Application server 28 includes a processor (not shown) and a memory (not shown). It should be understood that, as used herein, the term "processor" is not limited to just those integrated circuits referred to in the art as a processor, but broadly refers to a computer, a microcontroller, a microcomputer, a programmable logic controller, an application specific integrated circuit, and any other programmable circuit. It should be also understood that the processor executes instructions stored in application server 28. The above examples are exemplary only, and are thus not intended to limit in any way the definition and/or meaning of the term "processor".

The memory (not shown) can include any appropriate combination of alterable, volatile or non-volatile memory or non-alterable, or fixed, memory. An alterable memory, whether volatile or non-volatile, can include any number of static or dynamic RAM (Random Access Memory), a floppy disk and disk drive, a writeable or re-writeable optical disk and disk drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and disk drive or the like.

Figure 3:
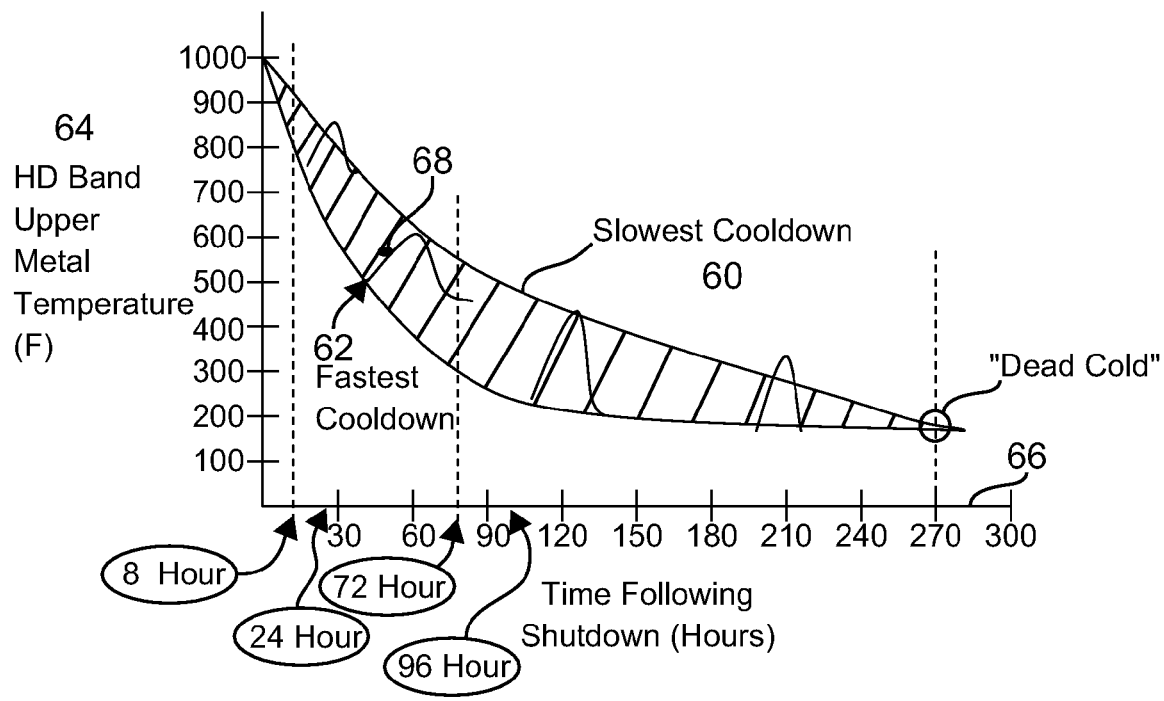
FIG. 3 is a graph showing a range of exemplary cool-down curves for an exemplary turbine engine.

FIG. 3 is a graph showing a range of exemplary cool-down curves for an exemplary turbine engine. More specifically, a slowest cool-down curve 60 and a fastest cool-down curve 62 are plotted as a function of temperature 64 and time following shutdown 66. Cool-down curves 60 and 62 represent cool-down characteristics of the same turbine engine. Moreover, it should be appreciated that different types of turbine engines may have different cool-down characteristics, yielding correspondingly different cool-down curves 60 and 62. Furthermore, it should be appreciated that cool-down characteristics of turbine engines are influenced by factors, such as, but not limited to, the amount and type of material used in fabricating the turbine engine, ambient temperature conditions, and the operating conditions of the turbine engine. For example, the more metal components a turbine engine includes, generally the longer it takes to cool-down the turbine engine.

Generally, operating in warmer ambient temperature conditions increases turbine engine cool-down time and operating in cooler ambient temperature conditions decreases turbine engine cool-down time. Ambient temperatures may be influenced by factors, such as, but not limited to, the location of a turbine engine within a power system, the season, and/or the geographic location of the turbine engine. For example, turbine engines may be exposed to warmer ambient conditions when positioned in the same vicinity as heat generating devices, such as boilers, within a power plant, when located in geographically warmer climates, and/or when exposed to warmer temperatures during the summer months. Thus, slower cool-down curves 60 may represent a cool-down of a given turbine engine during summer months and faster cool-down curve 62 may represent a cool-down of the same turbine engine during winter months. It should be appreciated that a probabilistic approach to lifting turbine engines considers substantially all of the factors that may influence the cooling characteristics of a turbine engine.

An area 68 defined between curves 60 and 62 represents a range of possible cool-down characteristics for a given turbine engine. Analyzing operational data of a given turbine engine enables possible cool-down curve variations between slowest cool-down curve 60 and fastest cool-down curve 62 to be determined. For example, in the exemplary embodiment, a probability distribution may be developed from operational data that reflects the probable turbine engine temperature at any time following shut-down. More specifically, in the exemplary embodiment, a Gaussian probability distribution is developed to determine a temperature between slowest cool-down curve 60 and fastest cool-down curve 62 for any time following shut-down. For example, ninety hours after shut-down, the turbine engine temperature could be between about 200° F. and about 400° F. A probability distribution developed for ninety hours after shut-down is used to determine a turbine engine temperature ninety hours after shut-down. Because a Gaussian probability distribution is used, it is most likely that the temperature ninety hours after shut-down should be about 300° F. It should be appreciated that although the exemplary embodiment uses a Gaussian probability distribution to determine the turbine engine temperature between slowest cool-down curve 60 and fastest cool-down curve 62, in other embodiments, any other type of probability distribution may be used that facilitates the lifting process described herein.

Each cool-down curve 60 and 62 includes a maximum temperature when the turbine engine is shut-down. As the amount of time elapses following shut-down increases, the turbine engine temperature decreases to a dead cold temperature of about 100° F. For example, cool-down curve 62 has a maximum temperature of about 1000° F. when the turbine engine is shut-down. As time after shut-down elapses, curve 62 illustrates that the turbine engine temperature decreases to a dead cold temperature of 100° F. It should be appreciated that curves 60 and 62 may have any shape and are specific to each turbine engine because they are determined using turbine engine operational data that is unique to that turbine engine.

It should be appreciated that in the exemplary embodiment turbine engines may be operated using many different operating strategies. For example, a first operating strategy may be to operate the turbine engine for about sixteen continuous hours each day and shut-down the turbine engine for about eight continuous hours each day. Thus, using this first strategy, the turbine engine experiences generally only one start and one shut-down daily. More specifically, after operating for about sixteen continuous hours, the turbine engine is shut-down at an operating temperature of about 1000° F. and cools-down for about eight hours to a temperature of between about 900° F. and about 950° F. Thus, when starting the turbine engine, because the turbine engine temperature is between about 900° F. and about 950° F., the turbine engine experiences a hot start. After starting, the turbine engine operates at a steady-state operating temperature of about 1000° F. and is again shut-down after about sixteen continuous hours.

A second operating strategy may be to continuously operate a turbine engine twenty-four hours a day for about three-hundred-twenty consecutive days each year, and then shut-down the turbine engine for about forty consecutive days. Using the second strategy, the turbine engine experiences very few starts and very few shut-downs, as compared to the first operating strategy. It should be understood that in the second strategy each turbine engine start is a "cold" start.

A third operating strategy may be to continuously operate the turbine engine twenty-four hours a day for about five consecutive days, and then shut-down the turbine engine for the following two consecutive days. Using the third operating strategy, the turbine engine generally experiences one start and one shut-down each week. It should be understood that in the third operating strategy, each start may be a hot or warm start. It should be appreciated that although the exemplary embodiment is described as having three turbine engine operating strategies, in other embodiments, any turbine engine operating strategy may be implemented that facilitates the lifting process described herein.

In the exemplary embodiment, the operating strategy of a turbine engine determines the turbine engine's associated mission mix. More specifically, a turbine engine's mission mix is defined as the number of cold starts, warm starts, and hot starts that a turbine engine experiences during its useful life. For example, a turbine engine's mission mix may include four hundred cold starts, five hundred warm starts, and two thousand hot starts. Generally, a cold start occurs at turbine engine temperatures ranging from about 100° F. to about 400° F., warm starts occur at turbine engine temperatures ranging from about 400° F. to about 700° F., and hot starts occur at turbine engine temperatures greater than 700° F.

It should be appreciated that in the exemplary embodiment, actual operating strategies and associated mission mix data are collected for each turbine engine being analyzed. In the exemplary embodiment, probabilistic models are developed corresponding to the operational strategy for each turbine engine using the collected data. The probabilistic models are combined with cyclic life expenditure data for different components within the turbine engine. By performing such a probabilistic analysis, the total life expended over the expected operational duration of a turbine engine may be calculated. Moreover, the probabilistic analysis may also be used to calculate the probability of a certain component within the turbine engine meeting the design useful life for a given operational strategy. Furthermore, it should be understood that because actual turbine engine operating strategies and mission mix data are used, all parameters effecting turbine engine performance are inherently captured and are included in the lifting process described herein.

Figure 4:
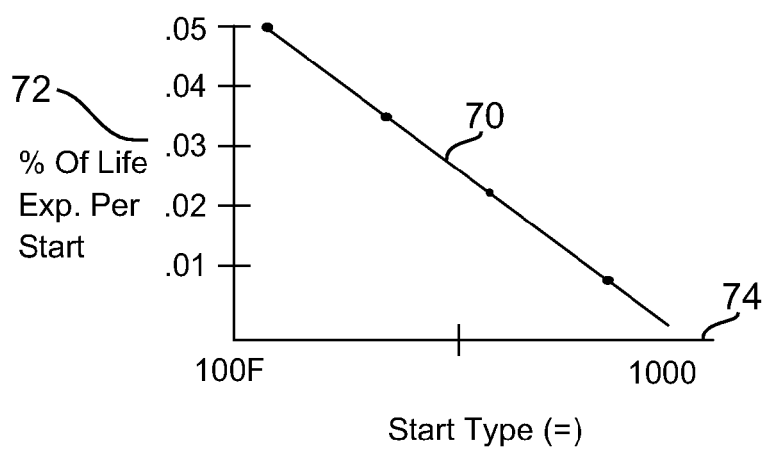
FIG. 4 is a graph showing a predicted life expended per start curve for the exemplary turbine engine.

FIG. 4 is a graph showing an exemplary life expended per start curve for an exemplary turbine engine. More specifically, an expended life per start curve 70 is plotted as a linear function of a percent of life expended per start-up 72 and a start type 74 determined by temperature. It should be understood that curve 70 represents the performance of a new turbine engine and as such is based on design predictions. In addition, it should also be noted that for different turbine engines, the slope of the curve on FIG. 4 would be different.

It should be appreciated that each turbine engine is designed to have a finite useful life and that each turbine engine generally experiences detrimental wear and tear during starting. Thus, at least some of the design useful life of a turbine engine is expended during starting. It should be appreciated that although the exemplary embodiment describes life expended per start curve 70 as a linear function extending between the amount of life expended during starting and the type of start 74, in other embodiments, curve 70 may be any type of non-linear function that facilitates the lifting process described herein.

Enhancing the accuracy of the determination of the useful life expended during each start facilitates enhancing the accuracy in determining the useful life of a turbine engine. Start type 74 indicates the turbine engine temperature during starting, and as such, start type 74 also indicates whether the start is a cold start, a warm start, or a hot start. It can be seen that each type of start expends a different amount of the turbine engine's useful life. For example, a turbine engine may be designed to experience a total of about 2000 cold starts during its useful life expending about ½000$^{th}$ fraction of its total life for each start. Colder starts generally expend more of a turbine engine's useful life, and hotter starts generally expend the least amount of life from a turbine engine. It should be understood that as the turbine engine is in service and data is collected, a turbine engine specific curve 76 (shown in FIG. 5) may be developed.

Figure 5:
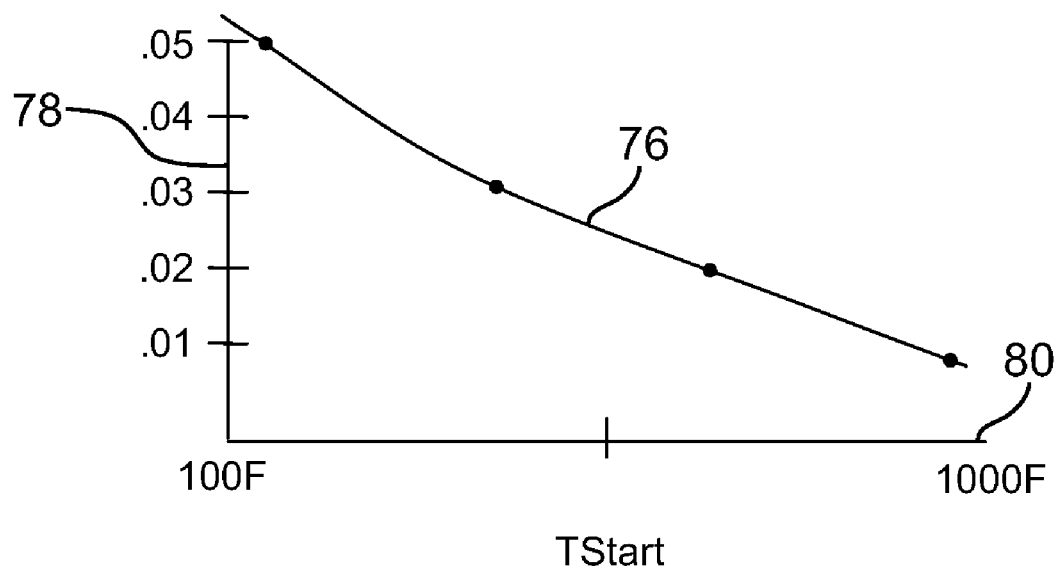
FIG. 5 is a graph showing an alternative embodiment of a life expended per start curve for an exemplary turbine engine.

FIG. 5 is a graph showing another exemplary life expenditure per start curve 76. More specifically, a life expenditure per start curve 76, determined using turbine engine operating data, is plotted as a function of a percent of life expended per start-up 78 and a start type 80 determined by temperature. It should be understood that curve 76 is turbine engine specific, and as such may be different for each turbine engine.

Figure 6:
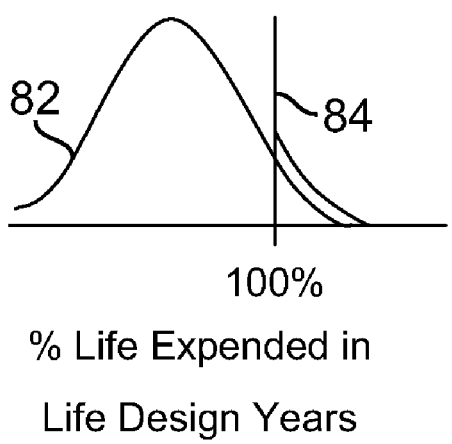
FIG. 6 is a graph showing an exemplary probability distribution for an exemplary turbine engine operating strategy.

FIG. 6 is a graph showing an exemplary probability distribution for the first strategy. More specifically, a curve 82 illustrated represents a Gaussian probability distribution of the probability that the turbine engine, or turbine engine components, will fail by prematurely exceeding the turbine engine's design useful life using the first operating strategy. A limit 84 defines a level of acceptable risk of prematurely exceeding the turbine engine's useful life, or premature turbine engine failure. Thus, a turbine engine may be designed, in consideration of the risks or probabilities that it may prematurely fail. The limit 84 may be defined at a level that facilitates enhancing the turbine engine lifting process described herein. It should also be appreciated that although the exemplary embodiment uses a Gaussian probability distribution for determining the probability of premature turbine engine failure using the first operating strategy, in other embodiments, any probability distribution may be used that facilitates the lifting process described herein.

Figure 7:
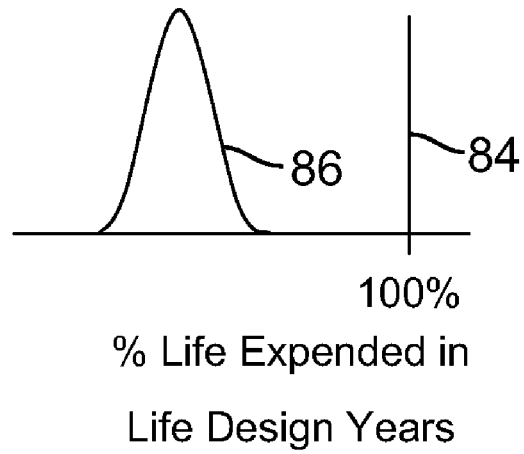
FIG. 7 is a graph showing another probability distribution for an alternative turbine engine operating strategy.

FIG. 7 is a graph illustrating an exemplary probability distribution for the second operating strategy. More specifically, a curve 86 is illustrated that represents a Gaussian probability distribution of the probability that the turbine engine will fail by prematurely exceeding the turbine engine's design useful life, using the second operating strategy. In the exemplary embodiment, because limit 84 does not intersect with curve 86, the turbine engine should not prematurely fail. Thus, using the second operating strategy, the risk that the turbine engine will prematurely fail is substantially eliminated or minimized. It should be appreciated that although the exemplary embodiment uses a Gaussian probability distribution for determining the probability of premature turbine engine failure using the second strategy, in other embodiments, any probability distribution may be used that facilitates the lifting process described herein.

Figure 8:
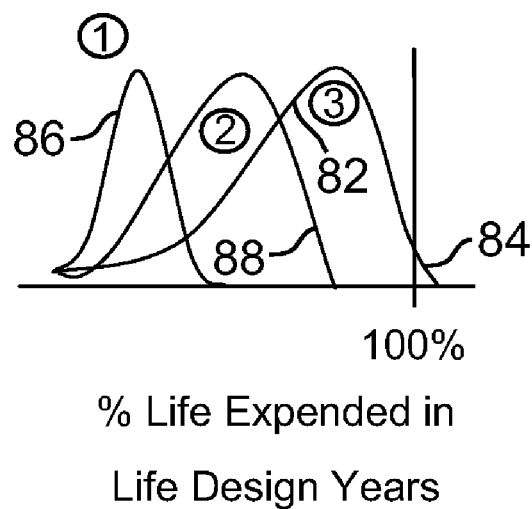
FIG. 8 is a graph showing a plurality of exemplary turbine engine operating strategy probability distributions superimposed on each other.

FIG. 8 is a graph illustrating the exemplary probability distributions for the first operating strategy 82, the second operating strategy 86 and a third operating strategy 88. By superimposing the probability distributions, the performance of alternative operating strategies can be more easily compared. For example, because probability distribution curve 82 is closest to acceptable limit of risk 84, turbine engines operating strictly in accordance with the first operating strategy are more likely to fail prematurely than turbine engines operating according to other operating strategies. Consequently, turbine engines operating according to the first operating strategy should be more frequently inspected for maintenance issues as compared to turbine engines operating under other operating strategies. Likewise, for turbine engines operating further from acceptable level of risk 84, fewer inspections are required because such turbine engines are less likely to fail prematurely.

Figure 9A:
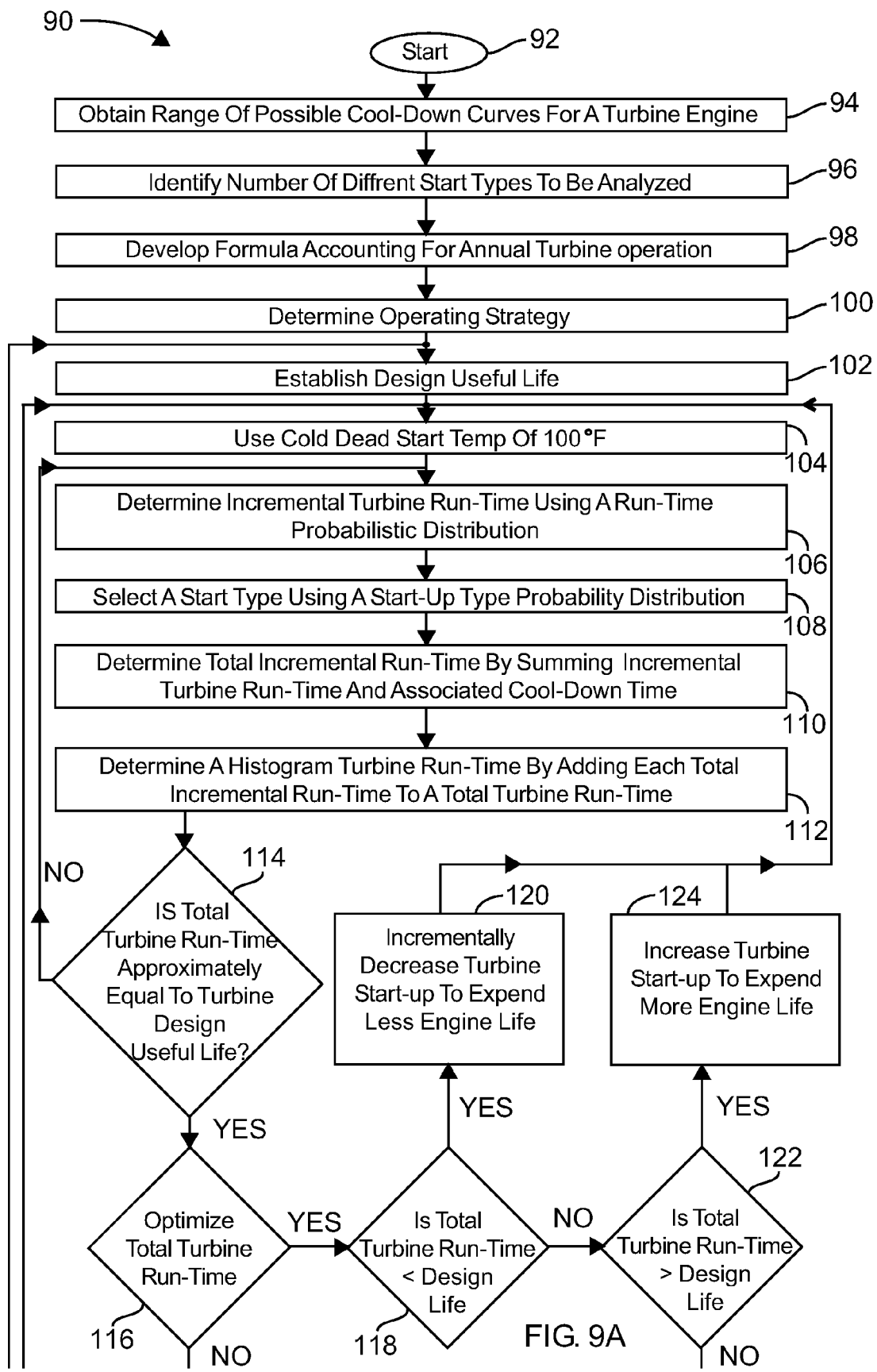
FIG. 9 is a flowchart illustrating exemplary processes utilizing a CLPUI.
Figure 9B:
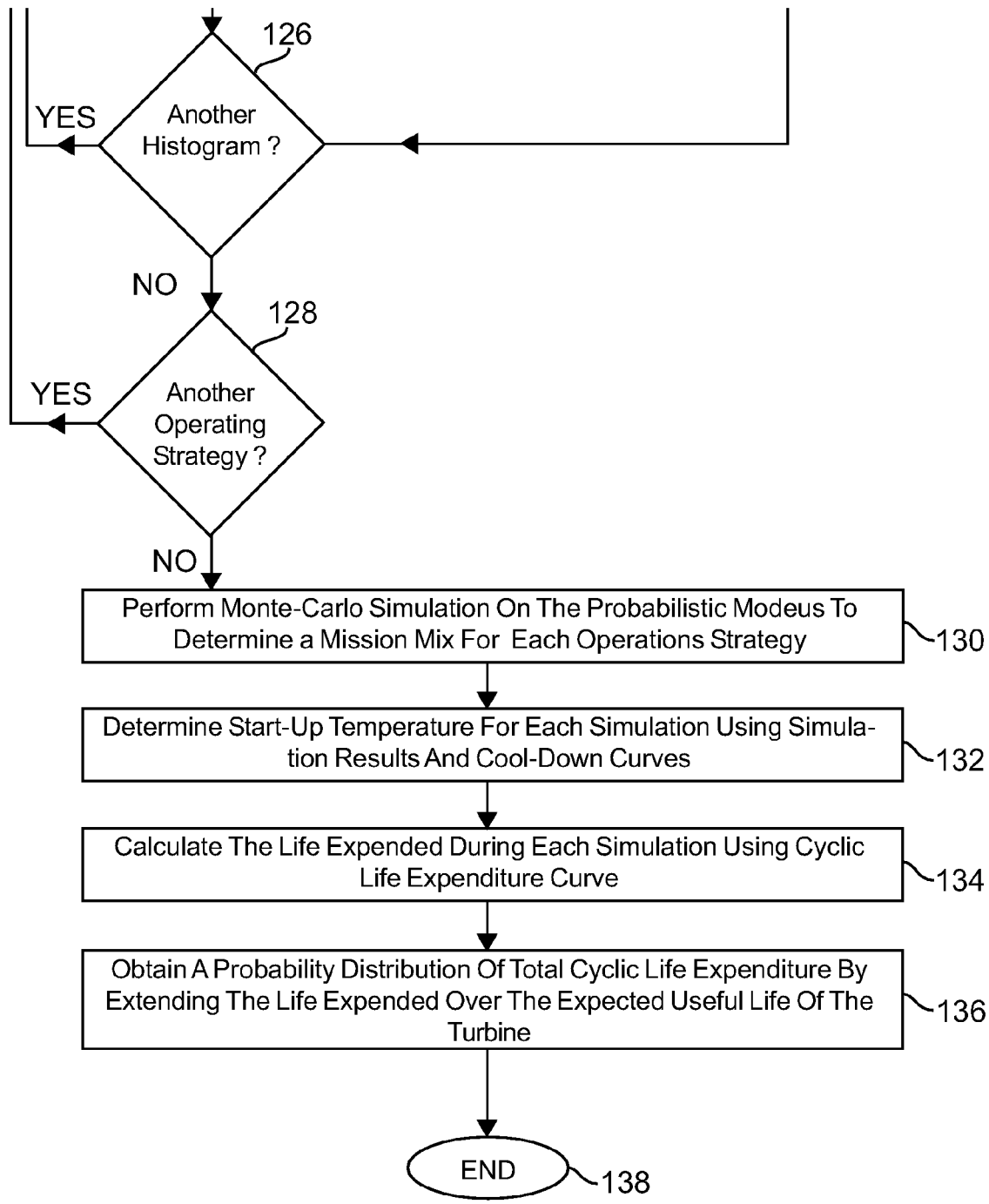

FIG. 9 is a flowchart 90 illustrating exemplary processes used by CLPUI system 10 (shown in FIG. 1) to facilitate determining a probabilistic mission mix-based turbine engine component lifting process. The lifting process starts 92 by defining or obtaining a range of possible cool-down curves for the turbine engine to be analyzed 94. A number of different start types identified and analyzed 96 from turbine engine operating data to obtain or define life expenditure curve 76. It should be appreciated that the start types are generally defined by temperature. Accordingly, there may be temperature ranges that define start types, such as, cold starts, warm starts, and hot starts. Moreover, start types may also be defined by specific turbine engine start temperatures. For example, a start occurring at a turbine engine temperature of about 431° F. is considered to be a 431 start. A formula is then developed that accounts 98 for operation of the turbine engine during a year. Specifically, in the exemplary embodiment, the formula accounts for turbine engine operation on an hourly basis during a year and considers substantially all possible mission mixes. That is, the formula accounts for at least the number of hours of start times, steady-state turbine engine operations, and shut-down times that occur during the course of a year. Thus, during analysis, the turbine engine cannot operate for more than the total number of hours in a year.

An operating strategy is then determined 100 for the turbine engine. For example, using the first operating strategy 82, the turbine engine operates continuously for about sixteen hours and is shut-down for about eight continuous hours daily. After determining the operating strategy 100, the design useful life of the turbine engine is established 102. In various embodiments, the turbine engine design useful life may be any period of time appropriate for the specific turbine engine being analyzed or modeled.

During analysis, each turbine engine initiates operation at a beginning time from a dead cold start temperature 104 of about of 100° F. The beginning time, operating strategy, design useful life, and cold start temperature are included in the analysis to establish histograms reflecting turbine engine operational data. It should be appreciated that a probabilistic distribution is used to determine 106 an incremental run-time of the turbine engine 106, and a start type is selected 108 using a start type probability distribution 108. In the exemplary embodiment, the run-time and start type probability distributions (not shown) are both Gaussian type probability distributions. However, it should be appreciated that in other embodiments, any type of probability distribution may be used for the run-time and start type that facilitate the lifting process described herein.

Each incremental run-time is associated with a cool-down time. In the exemplary embodiment, the cool-down time between a turbine engine shut-down and a subsequent start is determined using a predetermined Gaussian probability distribution. Thus, a total incremental run-time is determined by summing the incremental turbine engine run-time with its associated cool-down time 110. Each total incremental run-time is added 112 to a total turbine engine run-time. The total turbine engine run time 112 is a cumulative sum of the previous total incremental run-times. It should be appreciated that the total turbine engine run-time is taken from the beginning of turbine engine operations, while the start and shut-down temperatures for each total incremental run-time, the incremental run-time, and the corresponding times for the start and shut-down temperatures, are measured from the first time stored in database 24. Thus, a histogram for the chosen operating strategy of the total turbine engine run time-duration is determined 112.

When the total turbine engine run-time is not approximately equal to the turbine engine design useful life 114, another incremental turbine engine run-time is determined 106. Alternatively, when the total turbine engine run-time is approximately equal to the turbine engine design useful life 114 the total turbine engine run-time may then be optimized 116. When optimizing 116 the total turbine engine run-time, the total turbine engine run-time is compared 118, 122 against the turbine engine design useful life. When the total turbine engine run-time is less than the design useful life 118, the turbine engine start is incrementally decreased 120 to expend less engine life 120. More specifically, the manner in which the turbine engine is started is changed to implement a slower start, which expends less engine life per start, and the cold start temperature is set 104. Alternatively, when the total turbine engine run-time is not less than the turbine engine design useful life, the total turbine engine run-time is compared 122 against the turbine engine design useful life to determine 122 whether the total turbine engine run-time is greater that the turbine engine design useful life 122. If the total turbine engine run-time is greater than the turbine engine design useful life, the turbine engine start is increased to expend more engine life 124 with each start. That is, the manner in which the turbine engine is started, during analysis, is changed to implement a faster start which expends more engine life 124 per start-up. Then, the cold start temperature of 100° F. is set 104.

When the total turbine engine run-time is not less than the design useful life 118 and is not greater than the turbine engine design useful life 122, if desired, another histogram may be generated 126 for the chosen or determined operating strategy. If another histogram is desired 126, the cold start temperature of 100° F. is set 104. If another histogram is not desired 126, another operating strategy 128 may be determined 100 and corresponding histograms may be generated. In the exemplary embodiment, a plurality of histograms is developed for each operating strategy until the histograms converge to a proper probabilistic model, thus yielding a substantially complete spectrum of the turbine engine's operation for the particular operating strategy. Generally, three to five histograms are required to develop an accurate probabilistic model for the particular operating strategy. However, in other embodiments, any number of histograms may be generated that are required to converge to a proper probabilistic model for the operating strategy.

After an accurate probabilistic model has been determined for each desired operating strategy, and when another operating strategy is not desired 128, a Monte-Carlo simulation is performed on each of the probabilistic models to determine a mission mix corresponding to each operating strategy 130. It should be appreciated that although the exemplary embodiment performs a Monte-Carlo simulation, in other embodiments, any type of simulation tool may be used that facilitates developing the lifting process described herein. During the Monte Carlo simulation, turbine engine starting temperatures are determined using a range of cool-down curves. An amount of life expended during each simulation is determined using life expenditure curves 134. A probability distribution of the total cyclic life expenditure is determined 136 by extending the life expended over the expected useful life of the turbine engine (shown in FIGS. 6-8).

In each embodiment, the above-described methods of extending the useful life of turbine engines facilitate establishing a process of developing a probabilistic lifting criteria based on operational data. More specifically, a detailed analysis of field operational data is used to identify trends or patterns that can provide a window into the real operational strategies of different turbine engines. Using a probabilistic lifting criteria approach, it is possible to develop a mission mix that is physically possible because the turbine engine operational duration adds up to the number of hours in one year. Moreover, the probabilistic lifting criteria will enable better risk-and-reward evaluation of turbine engine design alternatives, and will ensure that turbine engines and turbine engine components are not over-designed with unrealistic assumptions, thus facilitating reducing design cycle time and cost. Furthermore, using a probabilistic lifting process enables using operational data to determine design decisions and reduces design time and costs. Accordingly, turbine engine performance and component useful life are each facilitated to be enhanced in a cost-effective and reliable manner.

Exemplary embodiments of methods for facilitating mission mix-based turbine engine component lifting process are described above in detail. The methods are not limited to use with the specific turbine engine embodiments described herein, but rather, the methods can be utilized independently and separately from other turbine engines described herein. For example, the methods may be used with any utility, industrial, or mechanical drive turbine engine. Moreover, the invention is not limited to the embodiments of the method described above in detail. Rather, other variations of the method may be utilized within the spirit and scope of the claims.

While the invention has been described in terms of various specific embodiments, those skilled in the art will recognize that the invention can be practiced with modification within the spirit and scope of the claims.

What is claimed is:

1. A system for facilitating a probabilistic mission mix-based lifing process for turbine engine systems and sub-systems, said system comprising:
    at least one computer configured as a server, said server containing a database, said server configured to:
    store within said database operational data for at least one turbine engine, a plurality of cool-down curves for said at least one turbine engine, a plurality of different start types for said at least one turbine engine, at least one operating strategy and a design useful life of said at least one turbine engine;
    analyze said operational data stored within said database;
    develop at least one histogram and at least one probabilistic model using said operational data and store said at least one histogram and said at least one probabilistic model within said database;
    determine a mission mix for said at least one operating strategy;
    perform a simulation of said at least one probabilistic model combined with turbine engine cyclic life expenditure data of said at least one turbine engine;
    obtain a probability distribution of a total cyclic life expenditure by extending a life expended over said design useful life of said at least one turbine engine; and
    optimize a total turbine engine run-time.

2. A system in accordance with claim 1 wherein said server is further configured to determine a start temperature of said at least one turbine engine for the simulation using at least one of said plurality of cool-down curves.

3. A system in accordance with claim 1 wherein said server is further configured to calculate a life expended during said simulation using said turbine engine cyclic life expenditure data.

4. A system in accordance with claim 1 wherein said server is further configured to define a plurality of cold temperature starts of said at least one turbine engine, a plurality of warm temperature starts of said at least one turbine engine, and a plurality of hot temperature starts of said at least one turbine engine.

5. A system in accordance with claim 1 wherein said server is configured to optimize the total turbine engine run-time by changing a manner in which said at least one turbine engine is started when said total turbine engine run-time is less than said design useful life of said at least one turbine engine.

6. A system in accordance with claim 1 wherein said server is further configured to develop a model of the at least one turbine engine including actual turbine engine operating strategies and mission mix data such that all parameters effecting performance of the at least one turbine engine in the simulation are inherently considered.

7. An apparatus for facilitating a probabilistic mission mix-based turbine engine system and sub-system lifing process, said apparatus comprising:
    means for storing operational data for at least one turbine engine, a plurality of cool-down curves for said at least one turbine engine, a plurality of different start types for said at least one turbine engine, at least one operating strategy and a design useful life of said at least one turbine engine;
    means for analyzing said operational data stored within said database;
    means for developing at least one histogram and at least one probabilistic model using said operational data and means for storing said at least one histogram and said at least one probabilistic model, wherein said means for developing at least one histogram comprise a means for optimizing a total turbine engine run-time;
    means for determining a mission mix for said at least one operating strategy;
    means for performing a simulation of said at least one probabilistic model combined with cyclic life expenditure data; and
    means for calculating a life expended during said simulation using said cyclic life expenditure data.

8. An apparatus in accordance with claim 7 further comprising means for obtaining a probability distribution of a total cyclic life expenditure by extending a life expended over said design useful life.

9. An apparatus in accordance with claim 7 further comprising means for determining a start temperature of said at least one turbine engine for the simulation using at least one of said plurality of cool-down curves.

10. An apparatus in accordance with claim 7 wherein said means for optimizing a total turbine engine run-time comprise changing a manner in which said at least one turbine engine is started when the total turbine engine run-time is less than the design useful life of said at least one turbine engine.

11. An apparatus in accordance with claim 7 wherein means for determining a mission mix further comprises means for defining a plurality of cold temperature starts of said at least one turbine engine, a plurality of warm temperature starts of said at least one turbine engine, and a plurality of hot temperature starts of said at least one turbine engine.

12. An apparatus in accordance with claim 7 further comprising means for including actual turbine engine operating strategies and mission mix data such that all parameters effecting performance of the at least one turbine engine in the simulation are inherently considered.

* * * * *